Oct. 15, 1935.  E. J. H. LIEBETRAU  2,017,466
MOWER GUARD CROSS BAR
Filed June 14, 1934

E.J.H.Liebetrau
Inventor

Attorneys.

Patented Oct. 15, 1935

2,017,466

UNITED STATES PATENT OFFICE 2,017,466

MOWER GUARD CROSS BAR

Elmore J. H. Liebetrau, Black Earth, Wis.

Application June 14, 1934, Serial No. 730,651

5 Claims. (Cl. 56—307)

This invention relates to cutter bar construction, the primary object of the invention being to provide a cutter bar for agricultural machines, including guard fingers, having detachable cross bars interlocked in such a manner that the fingers will be held in direct alignment with each other at all times, thereby eliminating wear, caused by lateral shifting of the fingers.

Another object of the invention is to provide means whereby worn cross bars of guard fingers may be readily removed and replaced, eliminating the necessity of discarding the worn cutter bar fingers in their entirety.

A further object of the invention is to provide detachable cross bars having means whereby adjacent guard fingers will be interlocked, insuring against the shifting of one guard finger with respect to another finger.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
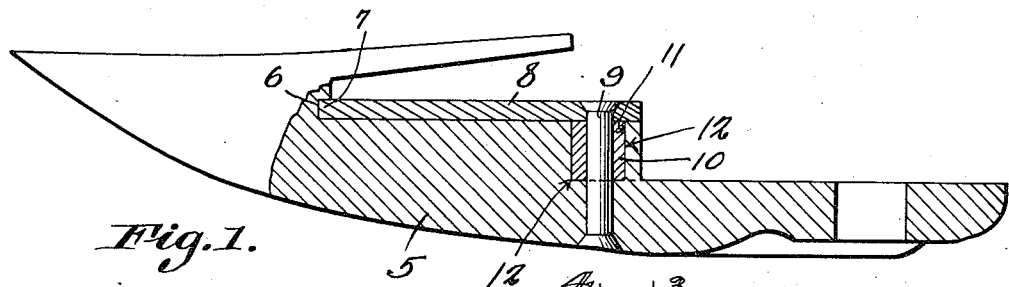
Figure 1 is a vertical sectional view through a guard finger of a cutter bar, constructed in accordance with the invention, the forward end of the guard finger being shown in elevation.
Figure 2:
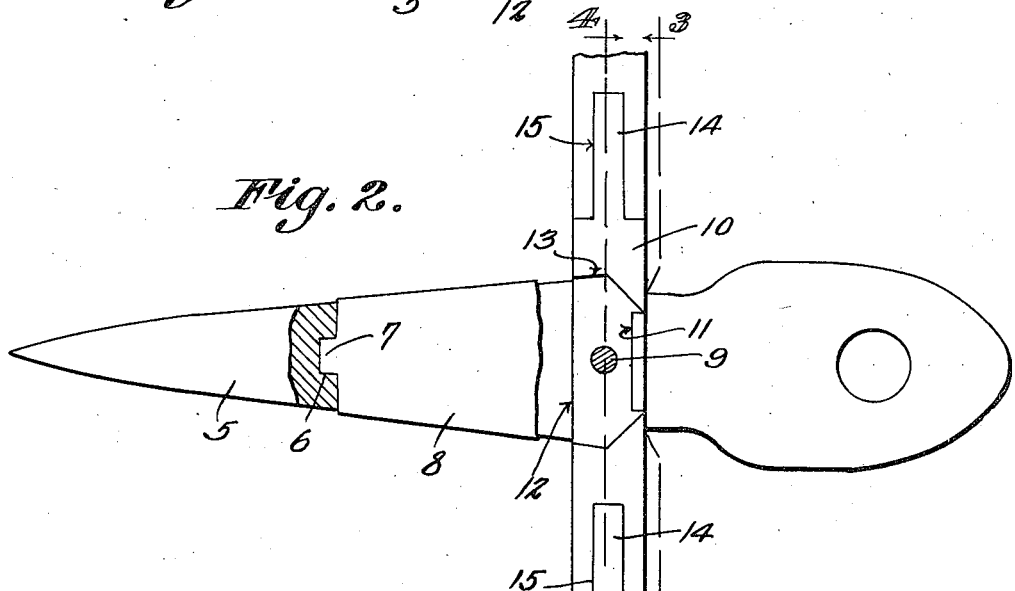
Figure 2 is a plan view of a guard finger supplied with detachable cross bars, a portion of the finger being broken away illustrating the construction of the forward end of the guard plate.
Figure 3:
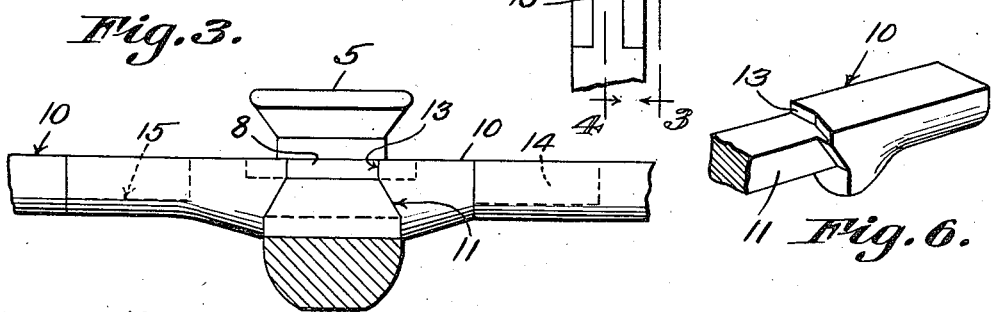
Figure 3 is a sectional view taken on line 3—3 of Figure 2.
Figure 6:
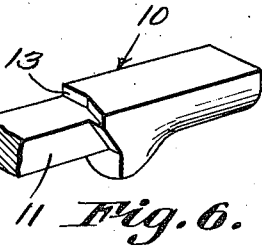
Figure 6 is a fragmental perspective view illustrating one end of a cross bar used at one end of the cutter bar.

Referring to the drawing in detail, the reference character 5 designates a guard finger of a cutter bar used on agricultural machines of various types.

Figure 4:
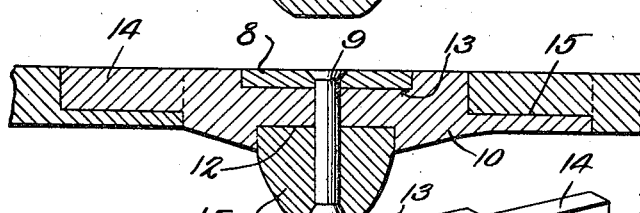
Figure 4 is a sectional view taken on line 4—4 of Figure 2.
Figure 5:
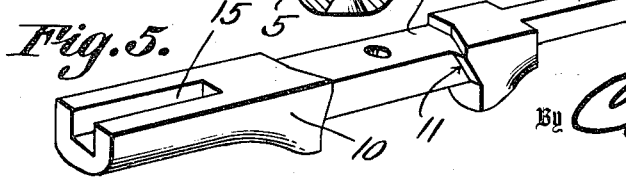
Figure 5 is a perspective view of a removable cross bar.

The guard finger is provided with a recess 6 for the reception of the extension 7 of the guard plate 8, which guard plate is held in position on the guard finger, by means of the rivet 9, which is shown in Figure 4 of the drawing, as extended through the guard plate, guard finger and cross bar.

A removable cross bar 10, forms a part of each guard finger, and as shown, each cross bar is provided with a central cut away portion 11 that fits within a cut away portion 12 formed in the upper surface of the guard finger associated therewith, the cut away portion being such as to insure a close fit between the cross bar and the guard finger.

A cut out portion 13 is formed in the upper surface of the cross bar of each guard finger, and is so designed that it will receive the inner end of the guard plate 8, associated therewith.

A cross bar of each intermediate guard finger is formed with an extension 14 disposed at one end thereof, while at the opposite end of the cross bar is a recess 15, the recess of one cross bar being designed to accommodate the extension of the adjacent cross bar, interlocking the ends of adjacent cross bars, and insuring against movement of one cross bar with respect to the adjacent cross bar. Thus it will be seen that due to this construction, twisting of one guard finger with respect to another guard finger will be prevented, thereby eliminating wear on the blades of the cutter bar, operating within the guard fingers.

The outer ends of the cross bars employed at the ends of the cutter bar, have wide upper surfaces, free of recesses, whereby these cross bars are especially strong and durable. The inner ends of these end cross bars are either formed with recesses to accommodate the extension of the adjacent cross bar, or formed with an extension to fit within a recess of the cross bar associated therewith.

Should it be desired to replace a cross bar, due to a worn or damaged cross bar, it is only necessary to remove the rivet, replace the cross bar with a new cross bar, and rerivet the cross bar and guard plate to the guard finger, thereby eliminating the necessity of discarding and replacing the entire guard finger in repairing the cutter bar.

Having thus described the invention, what is claimed is:

1. A finger bar for agricultural machines, comprising a plurality of guard fingers, removable cross bars having cut-out portions in their lower surfaces and fitted over the guard fingers, means for securing the cross bars to the fingers, each cross bar having a recess in its upper surface near one end thereof, the opposite end of each cross bar being formed into an extension, and the extension of one bar being fitted in the recess of the adjacent cross bar, securing the bars together.

2. A finger bar for agricultural machines, comprising a plurality of guard fingers, removable cross bars having cut-out portions in their lower sufaces and adapted to fit over the guard fingers, means for securing the cross bars to the guard fingers, each cross bar having an elongated rectangular recess in its upper surface extending to the end of the cross bar, a rectangular extension formed at the opposite end of each bar, the extension of one bar being fitted in the recess of the adjacent bar securing the ends of adjacent bars together.

3. A finger bar for agricultural machines, comprising a plurality of guard fingers, cross bars removably connected to the guard fingers, each cross bar having an elongated recess formed in the upper surface thereof and extended to the end of the cross bar, an extension formed at the opposite end of each cross bar, and the extension of one bar adapted to closely fit in the recess of the adjacent bar securing the bars together.

4. A finger bar for agricultural machines, comprising a plurality of guard fingers, a cross bar connected with each guard finger, each cross bar having a recess in the upper surface thereof and extending to the end thereof, an extension at the opposite end of each cross bar, and the extension of one bar adapted to closely fit in the recess of the adjacent bar.

5. A finger bar for agricultural machines, comprising a plurality of guard fingers, cross bars, each cross bar having a cut-out portion in the bottom thereof and adapted to fit over a guard finger, said cross bars having recesses in the upper surfaces thereof and adapted to receive a guard plate of a mower, each cross bar having a recess extending to one end thereof and having an extension at the opposite end thereof, and the extension of one cross bar adapted to be fitted in the recess of the adjacent cross bar securing the guard fingers against displacement.

ELMORE J. H. LIEBETRAU.